United States Patent

[11] 3,571,949

[72] Inventor John C. Gormley
115 Mira Loma, Vallejo, Calif. 94590

[21] Appl. No. 833,929
[22] Filed June 17, 1969
[45] Patented Mar. 23, 1971

[54] WORKSHOP DISPATCH SYSTEM
6 Claims, 5 Drawing Figs.

[52] U.S. Cl. .......... 35/24
[51] Int. Cl. .......... G09b 19/18
[50] Field of Search .......... 35/24, 24.2; 40/19.5, 124, 124.2

[56] References Cited

UNITED STATES PATENTS 3,381,393 5/1968 Burk .......... 35/24
3,500,557 3/1970 White .......... 35/24(.2)

*Primary Examiner*—Wm. H. Grieb
*Attorney*—Townsend and Townsend

ABSTRACT: A work scheduling and job dispatch system for use in workshops such as auto repair shops including a first pegboard section for inventorying available man/time intervals per job specialty performed in the shop, a second pegboard section for inventorying received work to be performed in the shop, and a plurality of pegs each identifying an employee and a preselected time interval, adapted for transfer between the pegboard sections whereby available man/time intervals per job specialty are assigned to the available work.

INVENTOR.
JOHN C. GORMLEY
BY
Townsend and Townsend
ATTORNEYS

INVENTOR
JOHN C. GORMLEY
BY
Townsend and Townsend
ATTORNEYS

WORKSHOP DISPATCH SYSTEM

This invention relates to a new and improved workshop job dispatch system suitable for scheduling work in shops such as automobile repair shops, electrical repair shops, plumbing shops, etc.

One of the problems faced by workshops such as automobile repair service shops is in matching the available employee man-hours with repair work received in the shop. If more work is brought in than can be handled by the shop, customers will be lost. On the other hand, if the amount of available work is over-estimated, employees must be paid for idle time.

It is therefore an object of the present invention to provide a work scheduling system for inventorying available man/time intervals per job specialty performed in the shop, on the one hand, and the available work to be performed in the shop, on the other hand, and for efficiently matching and allocating the available man/time intervals per job specialty with available work to be performed.

Another object of the invention is to provide a workshop scheduling system which affords accurate predictions as to when particular work will be done and whether additional work can be performed in the shop during the day or other specified work period.

In order to accomplish these results, the present invention contemplates providing a first pegboard section for inventorying available man/time intervals per job specialty performed in the shop comprising a flat base having a grid of holes arranged in rows and columns, and at least one additional column for listing and identifying shop employees by job specialty. Each row of holes corresponds to an employee identified by job specialty while the columns of holes correspond to preselected time intervals of a working period, such as half hour intervals of a day.

The invention further contemplates a second pegboard section for inventorying available work to be performed in the shop during a working period comprising a flat base having a grid of sections arranged in rows and columns, at least one of the columns suitable for listing and identifying customer work. Each row of grid sections corresponds to one of the customers. The columns of the grid sections correspond to each of the job specialties performed in the workshop. Each of the grid sections is adapted to receive a peg.

According to the invention, there is also provided a plurality of pegs, each peg identifying an employee and a preselected time interval of the working period, and each peg is adapted for placement in and transfer between the first and second pegboard sections whereby available man/time intervals per job specialty can be efficiently allocated and matched with the available work to be performed in the shop during that working period.

In one embodiment of the invention, the second pegboard section for inventorying available work to be performed comprises a flat base having a grid of holes arranged in rows and columns and a flat sheet adapted for placement over the flat base. The flat sheet is a printed form with a grid of sections arranged in rows and columns corresponding to and overlying in the holes in the flat base so that a new sheet form can be utilized for each working period, such as, for example, each day.

The pegs contemplated by the present invention can be of a variety of forms and in one embodiment each peg is formed with an elongate crown adapted for vertical or horizontal orientation.

In operating the system, as cars, for example, are brought in during a particular day, pegs in the first pegboard section corresponding to available employee time intervals for particular job specialties are removed from the first pegboard section and inserted through the job sheet overlaying the second pegboard section in appropriate columns of the grid corresponding to the work specialties to be done on the particular car. In this way, all the available man/time intervals per job specialty can be accurately and efficiently assigned to the available work as it is brought in during the day. Furthermore, accurate predictions as to when particular work will be done and whether additional work can be performed in the shop that day can be calculated.

When a particular job specialty to be performed on an article brought to the workshop will occupy several time intervals, each represented by a peg in the first pegboard section, the peg corresponding to the end of the interval when the particular job specialty will be completed is removed from the first pegboard section and inserted in the appropriate column and row of the second pegboard section. The preceding pegs corresponding to the intervals which will be utilized in completing the particular job specialty can be turned from a normal vertical orientation to a horizontal orientation thereby indicating that the particular time intervals have been sold.

Other objects, features and advantages of the present invention will become apparent in the following specification and accompanying drawings.

Figure 1:
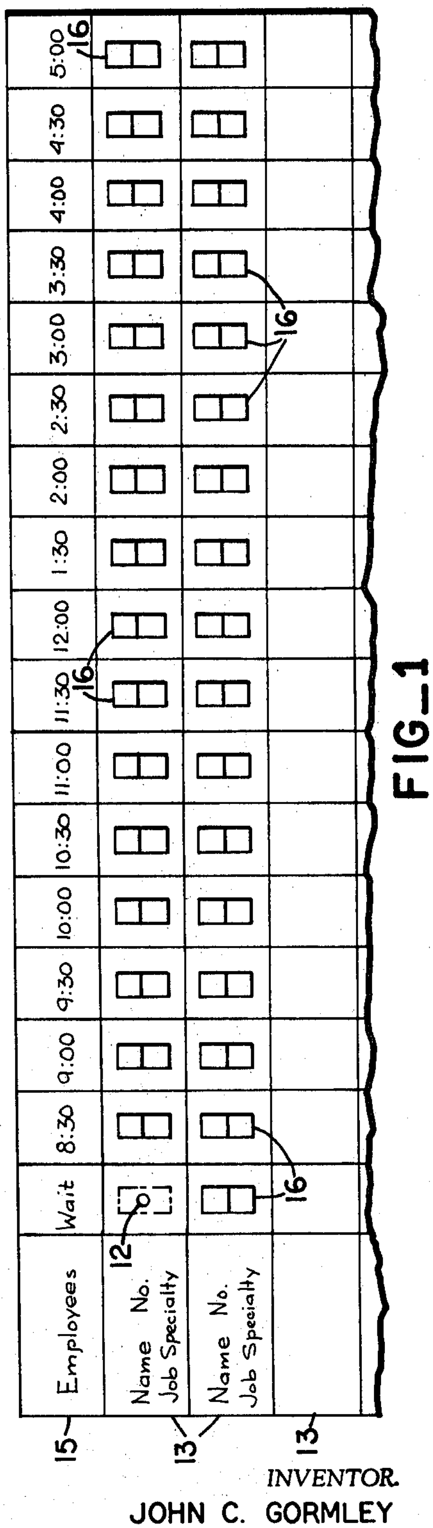
FIG. 1 is a diagrammatic illustration of the first pegboard section with the pegs oriented vertically before assignment of any of the employee time intervals per job specialty to available work.

The embodiment of the present invention described herein includes a first pegboard or time panel 10 illustrated in FIG. 1. The time panel 10 consists of a flat base 11 having a grid of holes 12 formed therein arranged in rows 13 and columns 14. An additional column 15 is provided for listing and identifying by number and job specialty each of the employees in the workshop. An additional row 16 identifies preselected time intervals of a working period such as, for example, half hour periods of a day. Thus, each row 13 of holes corresponds to a particular employee identified by job specialty while each of the columns 14 corresponds to a preselected time interval of the working period, namely, a half hour period of the day. An additional column labeled "wait" is provided as hereinafter described. The holes 12 in the grid of holes formed in time panel 10 are initially filled with pegs 16, each peg formed with an elongate crown oriented vertically thereby indicating that each employee time interval is available for assignment to work as work is received in the shop. Thus, the first pegboard section or time panel 10 provides a graphic inventory of the employee time intervals per job specialty available for work received in the workshop.

Figure 2:
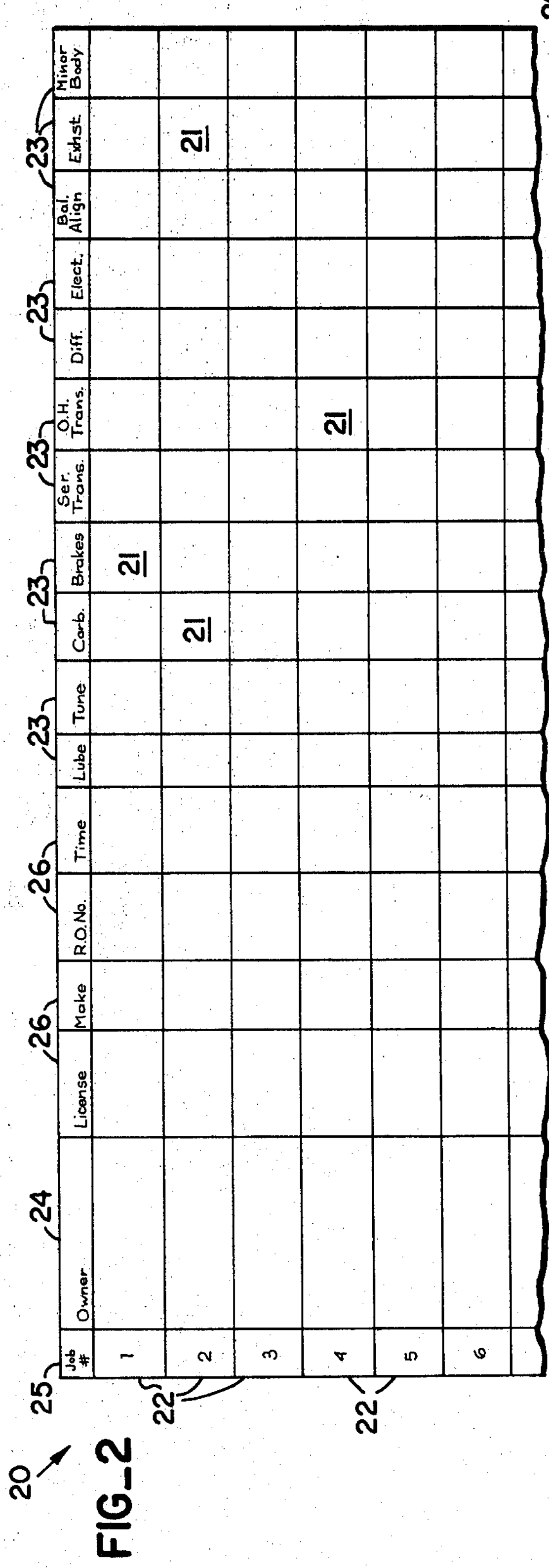
FIG. 2 is a diagrammatic illustration of the second pegboard section before any work has been received in the workshop for scheduling.

A second pegboard section and job sheet are provided for inventorying the work to be performed in the shop as the work is received in the workshop during a working period. A job sheet 20 for use in an auto repair shop, by way of example, is illustrated in FIG. 2. The job sheet consists of a grid of sections 21 arranged in rows 22 and columns 23. The job sheet 20 is adapted to overlie a flat base formed with the grid of holes arranged in rows and columns, so that the sections 21 formed by rows 22 and columns 23 are aligned with holes adapted to receive the pegs 16 from the first pegboard section 10. An additional column 24 is provided for identifying customer work and the owners of items to be the subject of work in the shop, in this example, the owners of automobiles brought into the auto repair shop during the day. Column 25 permits assignment of a number to each automobile as it is received, while additional columns 26 permit further identification of the automobile and the time when the owner indicates he will pick up the automobile from the workshop. Thus, each row of grid sections 21 corresponds to an automobile or other item to be the subject of work in the repair shop identified by owner and other characteristics. Each of the columns 23 corresponds to a job specialty performed in the shop, labeled such as, for example, in the case of an automobile repair shop, "Tune" for tune-up, "Carb." for carburetor adjustment, "Brakes" for brake adjustment, etc. A new job sheet is used each day and space is provided for the date.

Figures 3, 5:
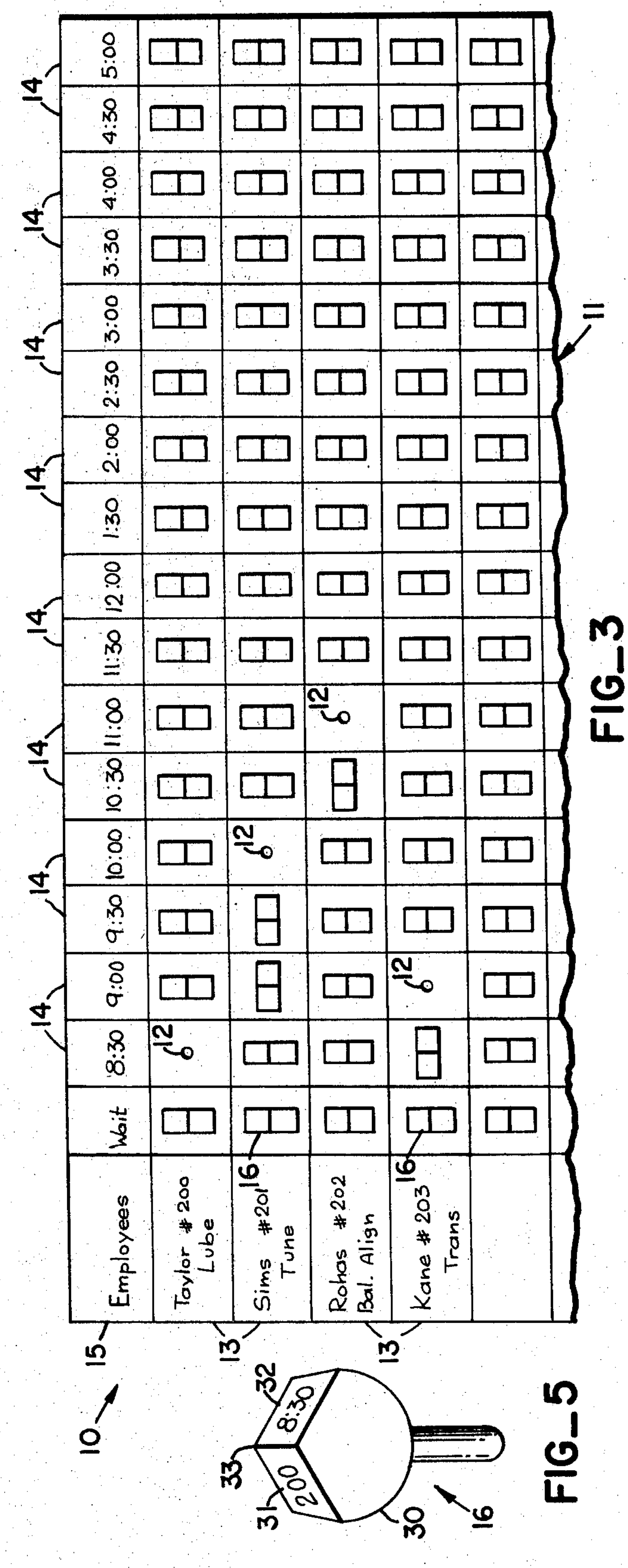
FIG. 3 is a diagrammatic illustration of the first pegboard section showing certain of the employee time intervals exhausted by assignment or allocation to available work.
FIG. 5 is a perspective view of a peg suitable for use in the job dispatch system.

A suitable peg for use in the work scheduling system described herein is illustrated in FIG. 5. The peg 16 is provided with an elongate crown 30 adapted for vertical or horizontal orientation in the holes of the pegboard sections. The upper surface of the elongate crown forms an obtuse angle with two sides 31 and 32 sloping from an apex 33. One side 31 is adapted to receive indicia identifying an employee by number, while the other side 32 is adapted to receive indicia identifying the end of a preselected time interval. Thus, as illustrated in FIG. 1, each of the columns 14 identifies a one-half hour time interval of the day, by the time at the end of the interval. Each peg 16 includes on the surface 32 of the peg the time at the end of the time interval specified by the column in which it is positioned. Thus the 8:30 column identifies the half hour interval from 8:00 to 8:30 and each peg 16 in the 8:30 column is printed with the identifying indicia 8:30 on the upper surface of the crown of the peg.

Figure 4:
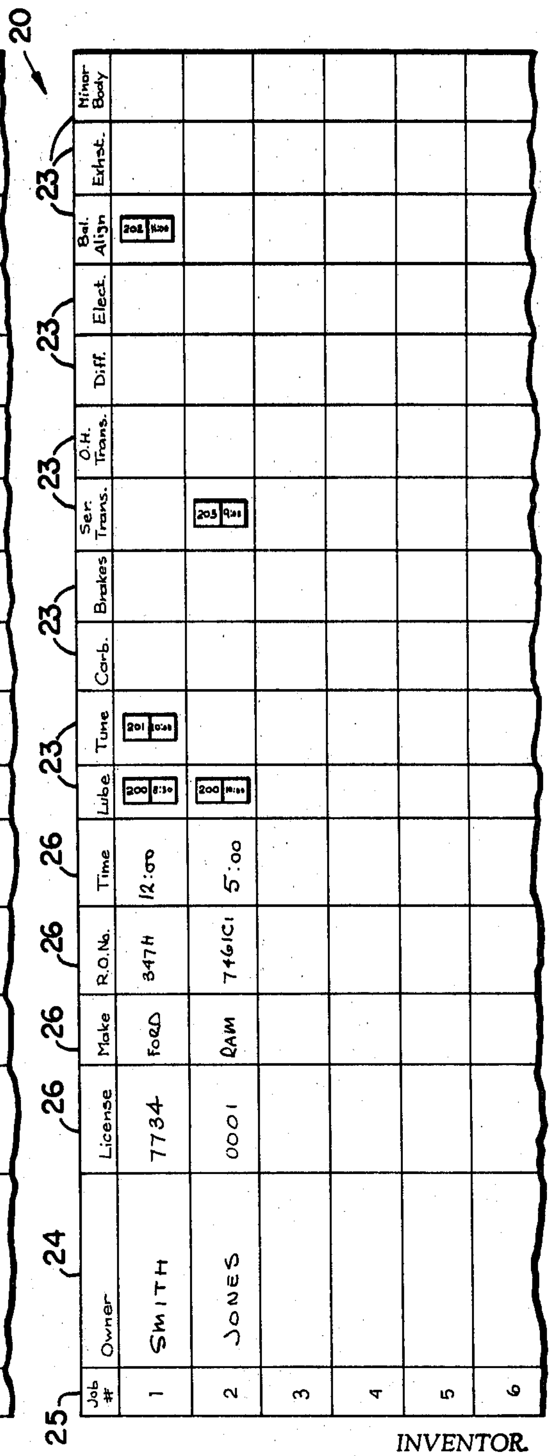
FIG. 4 is another diagrammatic illustration of the second pegboard section showing the scheduling and assignment of certain employee time intervals to the available work to be performed in the shop according to job specialties.

FIGS. 3 and 4 diagrammatically illustrate the operation of the system by way of two examples. The job sheet 20 is placed over a second pegboard section, not shown, formed of a flat base with a grid of holes positioned for alignment of the sections 21 on the job sheet 20 over the holes in the flat base so that a peg 16 can be inserted through each section 21 into a corresponding hole. The employees and technicians listed in time panel 10 are preferably listed in order of job specialties most often performed during the day. The two pegboard sections can be placed side by side or be formed as adjacent sections of a single flat base. As automobiles are brought in for service during the day, a service writer prepares a repair order for each vehicle which is then delivered to the operator of the job dispatch system for scheduling of the work. Work scheduling is accomplished by peg transfers and peg orientation as hereinafter described.

For example, the first repair order of the day may specify a lubrication requiring one-half hour of employee time, a tuneup requiring 1½hours of employee time, and a wheel alignment requiring 1 hour of employee time. The job dispatch system operator enters the name of the owner of the automobile and the identification data for the automobile in the appropriate columns of the first row of the job sheet 20. The system operator schedules the lubrication job first for the period from 8:00 to 8:30. The 8:30 peg from the time panel 10 for the first lube technician is therefore removed from the time panel 10 and inserted in the "Lube" column in the first row of the job sheet. It is noted that the peg indicating the time of completion of the job is the peg which is transferred between the pegboard sections. The tuneup is scheduled immediately following the lubrication for the one and one-half hour period from 8:30 to 10:00. The 10:00 peg for the first tuneup technician is therefore removed from the 10:00 column of the time panel for the first tuneup technician and inserted in the "Tune" column of the first row of the job sheet. To indicate that a total of one and a half hours of the first tuneup man have already been sold, the pegs in the 9:00 and 9:30 columns corresponding to the first tuneup technician are turned horizontal as illustrated in FIG. 3. Thus, horizontal orientation of the pegs in addition to absence of pegs indicates sold time, while vertical orientation of the pegs indicates time available to be sold. The last job specialty scheduled for the first automobile repair job is the wheel alignment requiring one hour of time. The operator schedules this job for the hour immediately following completion of the tuneup. The operator therefore withdraws the 11:00 peg from the first front-end or alignment technician and inserts it in the "Align" column of the first row of the job sheet. Because the wheel alignment will require the hour from 10:00 to 11:00, the 10:30 peg of the first alignment technician is turned horizontal indicating that the one hour period ending at 11:00 has been sold.

When a peg is transferred from the time panel 10 to the job dispatch sheet 20, it is initially inserted with a vertical orientation indicating that the assigned work has not yet been started. Once an assigned job specialty is under way, the peg in the job sheet 20 is turned to a horizontal position thereby indicating that the particular operation is under way.

As previously noted, vertically oriented pegs in the first pegboard section or time panel represent employee time intervals available for sale, while empty peg holes and horizontally oriented pegs indicate sold time. A heavy repair job requiring eight hours or longer of an employee's time is scheduled by placing the 5:00 peg in the appropriate column and row of the job sheet 20, and by turning all the preceding pegs of the technician's time on the time board 10 to the horizontal position. If it becomes necessary or desirable for quick service or emergency operations to use some of the time of the technician whose entire day has been allocated to the longer task, the peg in the "wait" column can be used to indicate on the job sheet 20 the short term task to which he has been assigned temporarily from the longer repair job. In a similar manner the pegs in the "wait" column can be used when temporarily diverting employees from longer tasks to which they have already been assigned.

As another example, the repair order for the second automobile received in the shop that day specifies a transmission service requiring approximately one hour, a complete lubrication requiring approximately one hour, and a minor engine tuneup also requiring approximately one hour. In scheduling the work advantage can be taken of the fact that the vehicle will be in the shop all day because the owner has specified that he will pick up the car at 5:00. Although the job dispatch system operator assigns the work immediately, the individual job specialties can be scheduled for any time intervals throughout the day. Thus, certain jobs can be scheduled for late in the day even though time is earlier available. In the present example, there being no immediate necessity for scheduling later in the day, the operator schedules the transmission job for the second automobile to the first transmission technician. Assuming that the automobile was received before 8:00, the first hour's schedule for the transmission service is to be completed by 9:00, the 9:00 peg of the first transmission technician is therefore removed from the time panel 10 and inserted in the transmission service column abbreviated "Ser. Trans." in the second row corresponding to the second auto. At the same time, the 8:30 peg for the first transmission technician is turned to a horizontal position thereby indicating that the first hour of his time has been sold. If the transmission technician begins the job immediately, the 9:00 peg inserted in the dispatch sheet 20 is turned from a vertical to a horizontal position thereby indicating that the job is being performed presently. The dispatch system operator then schedules the complete lubrication job requiring one hour and the minor engine tuneup requiring another hour to appropriate technicians.

As additional cars are brought in during the day, the work to be performed is scheduled in the manner described above. As the scheduling progresses, the available employee time intervals per job specialty gradually become exhausted. In particular, the available time intervals for technicians who perform the more often required services may be allotted sooner than the available time intervals for employees who perform heavier repairs and less required services. In this situation, the time panel 10, which provides an inventory of available man/time intervals per job specialty, indicates that the maximum work can be performed by scheduling the lighter services to technicians with general capabilities thereby avoiding the two dilemmas of turning away work and maintaining idle employees.

In some cases the same technician will perform more than one of the job specialties required by a given repair order. In that event, only the time peg at the end of the period of time in which the series of repairs will be completed by the same technician is removed from the time panel 10 and inserted in the column corresponding to the last of his repair jobs to be performed on that automobile. Preceding time pegs in the time panel 10 for the time period during which the different operations or job specialties are to be performed are oriented in a horizontal direction to indicate that the time has been sold. In order to indicate on the job sheet 20 the job specialties to be performed by the technician, plain marker pegs are also provided for insertion in the appropriate columns of the row corresponding to the auto vehicle for which the technician is performing a series of operations. The plain markets indicate that the same technician is performing each of the operations or job specialties for that automobile. The plain marker pegs can also be used to indicate special attention items such as a job held up because of unavailability of parts. In the event that minor body repairs are required, the automobile is turned over to the body shop superintendent for handling, and a plain peg is punched in the "Minor Body" column to act as a reminder of the whereabouts of the automobile.

As work reports are turned in by the individual technicians after completion of the job specialties, the corresponding pegs are removed from the job sheet 20 and returned to the time panel 10 with the peg oriented in a horizontal position. The work report is then compared with the job dispatch sheet 20 and filed according to the automobile job number for the next technician begins work, his peg in the job sheet is turned from a vertical to a horizontal position to indicate that his job specialty is being performed as scheduled. When all the work on a vehicle is completed, the job number to the left of the name of the customer owning the automobile is circled, as, for example, in red ink, for quick reference in determining completed jobs. If the work on an automobile is not completed on any one day or a particular job specialty is to be carried over for further work on the automobile on a subsequent day, a notation of the technician's number is marked on each grid section of the job sheet 20 beside each remaining peg in the board representing the work not yet completed. The job sheet 20 thereby clearly indicates which jobs are completed and which jobs remain to be completed the following day. When jobs must be carried over to the next day, they are rescheduled on a new job sheet for the next day, the pegs indicating the jobs which remain to be completed.

It is apparent from the foregoing description that the first pegboard section or time panel provides a graphic inventory of the employee time intervals per job specialty available for sale and assignment to work received in the workshop, at any time during the day or other working period. At the same time, the second pegboard section or job sheet provides a graphic inventory of the items brought into the workshop during the day, and the particular job specialties to be performed on each item. The second pegboard section also provides a graphic presentation of the work which has been performed and the work received but not yet completed at any time during the day. By means of the system of the present invention utilizing the two pegboard sections, the additional work which can be performed in the shop at any time during the day or other working period can accurately be gauged so that employees are not left idle, on the one hand, and so that more work than can be completed is not accepted for the particular working period. The job sheets provide an accurate day-by-day record of the work which has been performed in the shop and permit an evaluation of the work of individual employees for incentive purposes.

It is apparent that the work scheduling system contemplated by the present invention is applicable to a variety of workshops or repair shops in which a plurality of items are received for work and repairs and in which a variety of job specialties and operations are performed by the employees of the workshop. For example, the system finds application in plumbing shops, electrical shops, etc. Furthermore, the system is also applicable in workshops in which a variety of items are crafted or handmade and a variety of skills are performed by the employees of the workshop. For example, the system is applicable in metal working shops and blacksmith shops.

I claim:

1. A workshop job dispatch system comprising:

a first pegboard section for inventorying available man/time intervals per job specialty comprising a flat base having a grid of holes arranged in rows and columns, and at least one additional column for listing and identifying shop employees by job specialty, a row of holes corresponding to each employee, said columns of holes corresponding to preselected time intervals at a working period;

a second pegboard section for inventorying received work to be performed comprising a flat base having a grid of sections arranged in rows and columns at least one of said columns suitable for listing and identifying customer work, a row of grid sections corresponding to each said customer work and at least one of said rows adapted to identify job specialties performed at the shop, a column of the grid section corresponding to each said job specialty, each said grid section adapted to receive peg means; and a plurality of peg means, each said peg means adapted to identify an employee and a preselected time interval of a working period, said peg means adapted for placement in and transfer between said first and second pegboard sections whereby available man/time intervals per job specialty and received work can be efficiently matched.

2. A job dispatch system as set forth in claim 1 wherein said second pegboard section comprises a flat base having a grid of holes arranged in rows and columns and a sheet overlying said base.

3. A job shop dispatch system as set forth in claim 1 wherein each said peg means is formed with an elongated crown adapted for vertical or horizontal orientation in said first and second pegboard sections.

4. A job shop dispatch system as set forth in claim 3 wherein the upper surface of said elongate crown forms an obtuse angle with two sides sloping from an apex, one side adapted to receive indicia identifying an employee, the other side adapted to receive indicia identifying a preselected time interval.

5. A workshop job dispatch system comprising:

a first pegboard section for inventorying available man/time intervals per job specialty comprising a flat base having a grid of holes arranged in rows and columns, and at least one additional column for listing and identifying shop employees by job specialty, a row of holes corresponding to each employee, said columns of holes corresponding to preselected time intervals of a working period;

a second pegboard section for inventorying received work to be performed comprising a flat base having a grid of holes arranged in rows and columns and a flat sheet adapted for placement over the flat base, said sheet formed with a grid of sections arranged in rows and columns corresponding to and arranged for overlying the holes of said flat base at least one of said columns suitable for listing and identifying customer work, a row of grid sections corresponding to each said customer work, and at least one of said rows adapted to identify job specialties performed at the shop, a column of the grid sections corresponding to each said job specialty, each said grid section adapted to receive peg means for insertion in the corresponding hole; and a plurality of peg means, each said peg means adapted to identify an employee and a preselected time interval of a working period, said peg means adapted for placement in and transfer between said first and second pegboard sections whereby available man/time intervals per job specialty and received work can be efficiently matched.

6. A job dispatch system as set forth in claim 5 wherein each said peg means is formed with an elongated crown adapted for vertical or horizontal orientation in said first and second pegboard sections.